US012281769B2

(12) United States Patent
Bera et al.

(10) Patent No.: US 12,281,769 B2
(45) Date of Patent: Apr. 22, 2025

(54) MOTOR VEHICLE LIGHT MODULE COMPRISING A LOW WALL FOR POSITIONING AND/OR ATTACHING AN OPTICAL DEVICE

(71) Applicant: VALEO VISION, Bobigny (FR)

(72) Inventors: Sebastien Bera, Angers (FR); Sylvain Giraud, Angers (FR); Antonin Barrau, Angers (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/574,241

(22) PCT Filed: Jun. 28, 2022

(86) PCT No.: PCT/EP2022/067746
§ 371 (c)(1),
(2) Date: Dec. 26, 2023

(87) PCT Pub. No.: WO2023/275055
PCT Pub. Date: Jan. 5, 2023

(65) Prior Publication Data
US 2024/0142076 A1 May 2, 2024

(30) Foreign Application Priority Data
Jul. 1, 2021 (FR) ....................................... 2107158

(51) Int. Cl.
*F21S 41/33* (2018.01)
*F21S 41/25* (2018.01)
(Continued)

(52) U.S. Cl.
CPC ............. *F21S 41/338* (2018.01); *F21S 41/25* (2018.01); *F21S 41/36* (2018.01); *F21S 41/39* (2018.01); *F21S 41/55* (2018.01); *F21S 45/47* (2018.01)

(58) Field of Classification Search
CPC .......... F21S 41/338; F21S 41/25; F21S 41/36; F21S 41/39; F21S 41/55; F21S 45/47
See application file for complete search history.

(56) References Cited

U.S. PATENT DOCUMENTS

2016/0298818 A1* 10/2016 Duarte ................ H05K 1/0203

FOREIGN PATENT DOCUMENTS

CN 111412431 A 7/2020
EP 3 677 829 A1 7/2020
(Continued)

OTHER PUBLICATIONS

International Search Report & Written Opinion mailed on Oct. 10, 2022 in PCT/EP2022/067746 filed on Jun. 28, 2022, 12 pages).
(Continued)

*Primary Examiner* — Elmito Breval
(74) *Attorney, Agent, or Firm* — Oblon, McClelland, Maier & Neustadt, L.L.P.

(57) ABSTRACT

A motor vehicle light module has at least one first light source intended to emit first light rays and at least one second light source intended to emit second light rays. At least one optical device is configured to deflect at least a part of the first light rays and second light rays, and a support directly or indirectly supports the first light source and the second light source. At least one wall disposed on the support and configured to separate the first light rays from the second light rays, the optical device being positioned on and/or fixed to the wall.

19 Claims, 3 Drawing Sheets

(51) Int. Cl.

| | |
|---|---|
| ***F21S 41/36*** | (2018.01) |
| ***F21S 41/39*** | (2018.01) |
| ***F21S 41/55*** | (2018.01) |
| ***F21S 45/47*** | (2018.01) |

(56) References Cited

FOREIGN PATENT DOCUMENTS

| | | | |
|---|---|---|---|
| FR | 3 103 535 | A1 | 5/2021 |
| WO | WO 2021/105058 | A1 | 6/2021 |

OTHER PUBLICATIONS

Preliminary French Search Report dated Feb. 28, 2022 in French Application 2107158 filed on Jul. 1, 2021, with Translation of Categories).

* cited by examiner

MOTOR VEHICLE LIGHT MODULE COMPRISING A LOW WALL FOR POSITIONING AND/OR ATTACHING AN OPTICAL DEVICE

TECHNICAL FIELD

The invention relates to the field of lighting and/or signalling, in particular for motor vehicles. More particularly, the invention relates to a motor vehicle light module. For example, the motor vehicle light module is a motor vehicle lighting and/or signalling module.

In particular, the invention relates to a light module having a wall allowing an optical device to be positioned on and/or fixed to the light module.

PRIOR ART

A motor vehicle light module generally comprises at least one light source intended to emit light rays, and at least one optical device for deflecting at least a part of the light rays emitted by the light source. For example, the optical device makes it possible to deflect a part of the light rays in order to shape the light rays or to project the light rays so as to form a light beam.

In certain light modules, the optical device has a reflector designed to reflect the light rays emitted by the light source or sources and/or a projection lens designed to project the light rays. The light module also has a support on which the light source or sources is/are disposed.

To ensure that the light module operates properly, i.e. to ensure the shape of the light beam emerging from the light module and, for example, projected by the projection lens, said at least one optical device and the support need in particular to be positioned relative to one another.

To this end, it is known to provide reinforcements at the lateral ends of the light module to ensure the positioning of the optical device on the support. A specific location in the light module is thus provided for positioning these reinforcements. This location forms a protuberance from the side walls of the light module, and this protuberance serves only for positioning the optical device on and/or fixing it to the support. It does not have any optical function in the light module. In order for it to be possible to position the optical device on and/or fix it to the support, the dimensions of the module are therefore greater than the dimensions needed to realize the optical function of the light module.

However, the light module is generally positioned in a lighting device such as a headlight or tail light of the motor vehicle, where the available space is limited.

There is therefore a need to ensure the positioning of the optical device on and/or the fixing thereof to the support while limiting the dimensions of the light module, and, in particular, making it possible to limit the dimensions of the light module only to the dimensions needed for realizing its optical function.

SUMMARY OF THE INVENTION

To this end, according to a first aspect of the invention, a motor vehicle light module is provided, having:

- at least one first light source intended to emit first light rays and at least one second light source intended to emit second light rays;
- at least one optical device configured to deflect at least a part of the first light rays and second light rays,
- a support directly or indirectly supporting the first light source and the second light source,
- at least one wall disposed on the support and configured to separate the first light rays from the second light rays, the optical device being positioned on and/or fixed to the wall.

In particular, the optical device is positioned directly on and/or fixed directly to the wall.

Note that, in order for it to be possible to separate the first light rays and the second light rays, the wall is disposed between the lateral ends of the light module, at least in front of the first and second light sources following the direction of propagation of the light in the light module.

Thus, by virtue of the introduction of the wall onto the support, it is possible to position the optical device on and/or fix it to the support via the wall. Specifically, the optical device is positioned with respect to the wall, and since the wall is itself disposed on the support, this makes it possible to position the optical device with respect to the support.

Moreover, the optical device is positioned on and/or fixed to the support in a limited space. Specifically, the wall is disposed between the lateral ends of the light module, and therefore within the dimensions of the light module useful for realizing the optical function of the light module. By using the wall as an intermediate element for positioning and/or fixing the optical device, this makes it possible to position and/or fix the optical device within the dimensions of the light module used for realizing the optical function of the light module. Thus, this avoids the need to provide a protuberance situated on the sides of the support and on the sides of the optical device, and intended for positioning the optical device on the support.

Moreover, the positioning of the optical device on and/or the fixing thereof to the wall forms a single positioning and/or fixing point between the lateral ends of the optical device and of the support, and may make it possible to replace the protuberances that are generally situated at each lateral end of the light module and each form a positioning and/or fixing point. Thus, the number of positioning and/or fixing points is also reduced, thereby helping to reduce the dimensions of the light module.

Furthermore, since the positioning and/or fixing point formed by the positioning of the light module on and/or the fixing thereof to the wall is situated between the lateral ends of the light module, precise positioning and/or fixing of the optical device is/are ensured.

Moreover, the presence of the wall makes it possible to separate the first light rays emitted by the first light source and the second light rays emitted by the second light source, and therefore to avoid any interference of the second light rays by the first light rays.

According to one variant, the light module has a plurality of first light sources, each emitting first light rays, and/or a plurality of second light sources, each emitting second light rays.

According to one variant, the support has an upper face directly or indirectly supporting the first light source and the second light source, the upper face being intended to be a horizontal face when the light module is disposed in the motor vehicle.

Thus, the first and second light rays are emitted from the same side of the support, in particular in the same direction.

According to one variant, the support is a radiator configured to dissipate the heat energy emitted by the first light source and the second light source.

According to one variant, the wall is integral with the support.

The manufacturing cost of the light module is thus reduced.

Alternatively, the wall may be attached to the radiator and secured thereto.

According to one variant, the wall extends perpendicularly to the support.

In particular, the wall may extend vertically in the light module. The wall then extends parallel to a vertical direction extending from bottom to top in the light module when the light module is inserted into the motor vehicle, in a normal mounting position.

According to one variant, said at least one optical device comprises a projection lens having an optically active zone configured to project the first light rays and the second light rays in order to form a first light beam and a second light beam, respectively.

According to one variant, the projection lens extends in a transverse direction, defined as being transverse to an optical axis of the light module, and the support extends at least partially in a plane parallel to the transverse direction and to the optical axis of the light module.

According to one variant, the wall has a mounting lug, the projection lens has at least one mounting element which is situated at the periphery of the optically active zone and via which the projection lens is fitted in the light module, the mounting element having an orifice, the mounting lug of the wall being positioned in the orifice in the projection lens so as to position the projection lens on and/or fix it to the wall.

The projection lens is thus positioned directly on and/or fixed directly to the wall by the cooperation of the mounting lug and the orifice. In particular, the cooperation between the mounting lug and the orifice makes it possible to position the projection lens in a transverse direction and/or a longitudinal direction of the light module.

According to one variant, the projection lens has an additional mounting element at the periphery of the optically active zone and having at least one rib, and the support has a recess that is associated with each rib and receives the rib with which it is associated.

Said at least one rib makes it possible to help to position the projection lens on and/or fix it to the support, in addition to the cooperation between the mounting lug and the orifice.

According to one variant, the mounting element and the additional mounting element may be situated on a single part and may be situated on two separate parts.

According to one variant, the optically active zone has a lower edge, and the additional mounting element is situated along the lower edge of the optically active zone and has a first lateral rib and a second lateral rib that are each situated at a lateral end of the additional mounting element, and the support has a first recess that receives the first lateral rib and second recess that receives the second lateral rib.

In particular, the cooperation between the first lateral rib and the second lateral rib and their respective recesses makes it possible to position the lens in a vertical direction of the light module.

According to one variant, said at least one optical device comprises a reflector that is able to reflect the first light rays and the second light rays, the reflector being positioned on and/or fixed to the wall.

According to one variant, the reflector has at least one first reflective cavity that is able to reflect the first light rays emitted by the first light source and a second reflective cavity that is able to reflect the second light rays emitted by the second light source.

According to one variant, the projection lens has at least one first portion intended for the projection of the first light rays reflected by the first reflective cavity, and a second portion intended for the projection of the second light rays reflected by the second reflective cavity.

According to one variant, the wall has a first mechanical coupling element, the reflector has a second mechanical coupling element coupled to the first mechanical coupling element.

The reflector is thus positioned on and/or fixed to the wall by virtue of the first and second mechanical coupling elements.

According to one variant, the light module has a holding element cooperating with the first mechanical coupling element and the second mechanical coupling element in order to fix the reflector to the wall.

According to one variant, the first mechanical coupling element is a screw bushing, the second mechanical coupling element is a through-hole and the holding element is a main screw that passes through the through-hole and is screwed into the screw bushing.

According to one variant, the main screw is situated in front of the first reflective cavity and the second reflective cavity.

The fixing of the reflector in front by the main screw makes it possible to position the reflector precisely with respect to the support and therefore with respect to the first and second light sources.

According to one variant, the reflector has at least one additional through-hole, the support has an additional screw bushing associated with each additional through-hole, and the light module has an additional screw which is associated with each additional through-hole and associated screw bushing, passes through the additional through-hole with which it is associated, and is fixed in the additional screw bushing of the support with which it is associated, each additional screw being situated behind the first cavity and the second cavity.

This additional fixing is supplementary to the main fixing realized with the aid of the main screw.

This additional fixing allows the reflector to be held better in the light module.

According to one variant, the first light rays and the second light rays are each involved in the formation of a lighting beam with a cutoff, such as a low beam, or the first light rays are involved in the formation of a lighting beam with a cutoff, such as a low beam, and the second light rays are involved in the formation of a lighting beam without a cutoff, such as a high beam.

Alternatively, the first light rays and the second light rays are each involved in the formation of a signalling beam, such as a tail light or a brake light.

According to one variant, the wall has a wavy profile.

The wavy profile makes it possible to limit parasitic rays in the first and second light rays.

According to a second aspect, the invention relates to a motor vehicle lighting device, such as a headlight or a tail light, comprising a light module according to the invention.

According to a third aspect, the invention relates to a motor vehicle having the lighting device and/or the light module according to the invention.

BRIEF DESCRIPTION OF THE DRAWINGS

Other features and advantages of the present invention will become more clearly apparent from the description and the drawings, in which.

DETAILED DESCRIPTION

Figure 1:
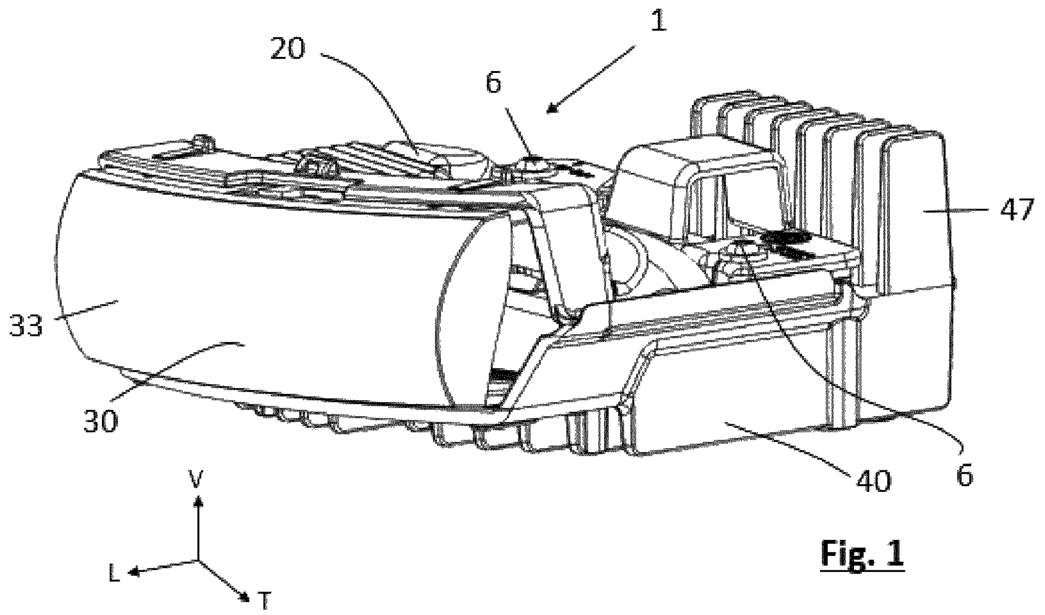
FIG. 1 shows a side view of the lighting device according to the invention, having a support, a projection lens and a reflector.

FIG. 1 shows a motor vehicle light module 1 according to the invention. This light module is intended to be positioned in a lighting or signalling device of a motor vehicle, such as a headlight or a tail light. Generally, the lighting or signalling device has an open housing and an outer lens that closes the housing, thereby forming a cavity for receiving the light module 1.

Throughout the description, the vertical, transverse and longitudinal directions are given with reference to the light module 1 when the latter is positioned on the vehicle. The longitudinal direction L corresponds to the direction from the rear to the front of the light module 1 and is substantially parallel to the optical axis of the light module 1. The transverse direction T corresponds to the direction perpendicular to the longitudinal direction, from one transverse edge of the light module 1 to the other transverse edge of the light module 1. The vertical direction V corresponds to the direction perpendicular to the longitudinal direction L and transverse direction T, and extends from bottom to top in the light module 1.

The front and rear directions are given in relation to the direction of propagation of the light in the light module 1 along the optical axis of the light module 1.

As can be seen in FIG. 1, the light module 1 has a support 40 and two optical devices, namely a reflector 20 and a projection lens 30.

Figure 2:
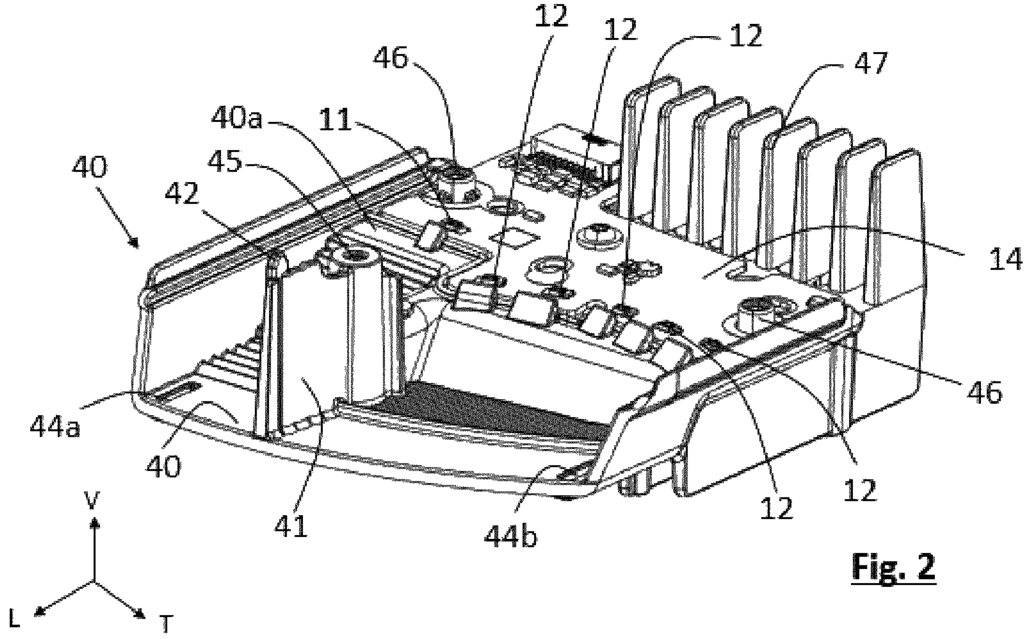
FIG. 2 shows the lighting device from FIG. 1, from which the projection lens and the reflector have been removed.

FIG. 2 shows the light module 1, from which the reflector 20 and the projection lens 30 have been removed. It is thus possible to see that the light module 1 has a first light source 11 for emitting first light rays, and a plurality of second light sources 12 for emitting second light rays.

In the example shown, the light module 1 has five second light sources 12. The number of the first light source 11 and of the second light sources 12 shown in the figures is by way of illustration and does not limit the invention only to this possibility. Specifically, alternatively, and without departing from the scope of the invention, the light module 1 could comprise a plurality of first light sources 11 or a single second light source 12 or a different number of second light sources 12.

For example, the first light rays and the second light rays are each involved in the formation of a lighting beam with a cutoff, such as a low beam. In particular, the first light rays may be involved in the formation of a light beam with a cutoff and of small extent (sometimes known as a kink), while the second light rays may be involved in the formation of a beam without a cutoff but with a greater extent (sometimes known as a flat), the superposition of these two light beams making it possible to create a low beam.

In another example, the first light rays are involved in the formation of a lighting beam with a cutoff, such as a low beam, and the second light rays are involved in the formation of a lighting beam without a cutoff, such as a high beam.

Alternatively, the first and second light rays could be involved in the formation of a signalling function such as a marker light function or a brake function.

The first light source 11 and the second light sources 12 are disposed on a printed circuit board 14 (or PCB), which is itself disposed on the support 40. In particular, the support 40 has an upper face 40*a* on which the printed circuit board 14 is disposed. Thus, the first light source 11 and the second light sources 12 are indirectly supported by the support 40, and more particularly, the first light source 11 and the second light sources 12 are indirectly disposed on the upper face 40*a* of the support 40.

In an alternative, the first light source 11 and the second light sources 12 could be directly supported by the support 40.

In the example described, the upper face 40*a* is intended to be a horizontal face when the light module is disposed in the motor vehicle, in a normal mounting position.

By being disposed on the upper face 40*a* of the support 40, the first light source 11 and the second light sources 12 are disposed on the same side of the support 40. The first light source 11 and the second light sources 12 therefore respectively emit the first light rays and the second light rays in the same direction.

In the example illustrated, the support 40 is a radiator. The support 40 thus makes it possible to dissipate the heat energy emitted by the first light source 11 and the second light sources 12. In particular, the radiator has a plurality of fins 47 that are involved in the dissipation of the heat energy emitted by the first light source 11 and the second light sources 12.

The support 40 also has a first recess 44*a* and a second recess 44*b* that are situated at each lateral end of the support 40. The first recess 44*a* and the second recess 44*b* are situated in front of the first light source 11 and the second light sources 12.

The support 40 also has two additional screw bushings 46. These additional screw bushings 46 are situated behind the first light source 11 and the second light sources 12.

The light module 1 also has a wall 41, which is disposed on the support 40 and makes it possible to separate the first light rays from the second light rays. In particular, the wall 41 extends on the same side of the support 40 as the upper face 40*a*, and in particular in front of the upper face 40*a* of the support 40.

In the example illustrated, the wall 41 is integral with the support 40. The wall 41 and the support 40 are thus produced in a single injection-moulding operation. The simultaneous injection moulding of the wall 41 with the support 40 makes it possible to limit the production cost of the light module 1.

Furthermore, the wall 41 can thus advantageously be involved in the dissipation of the heat energy emitted by the first light source 11 and the second light sources 12.

Alternatively, the wall 41 could be a separate part from the support 40 and be connected and secured to the support 40.

The wall 41 extends perpendicularly to the support 40. In the example illustrated, the wall 41 extends vertically in the light module 1. In other words, the wall 41 is intended to extend in a plane that extends in a direction parallel to the vertical direction V and a direction parallel to the longitudinal direction L when the light module is disposed in the motor vehicle, in a normal mounting position.

Since the first light source 11 and the second light sources 12 are disposed on the upper face 40*a* of the support 40, the vertical wall 41 makes it possible to effectively separate the first light rays and the second light rays.

The wall 41 comprises a mounting lug 42. The mounting lug 42 is situated at the front of the wall 41. The mounting lug 42 protrudes from the upper end of the wall 41.

The wall 41 also has a screw bushing 45 forming a first mechanical coupling element 45. This screw bushing 45 is situated at the rear of the wall 41.

The wall 41 has a wavy profile. This wavy profile makes it possible to limit parasitic rays in the light module 1. In particular, this wavy profile prevents the first light rays from interfering with the second light rays and vice versa.

As described above, the light module 1 has a reflector 20 and a projection lens 30. The reflector 20 and the projection lens 30 each make it possible to deflect at least a part of the first light rays and of the second light rays.

Figure 3:
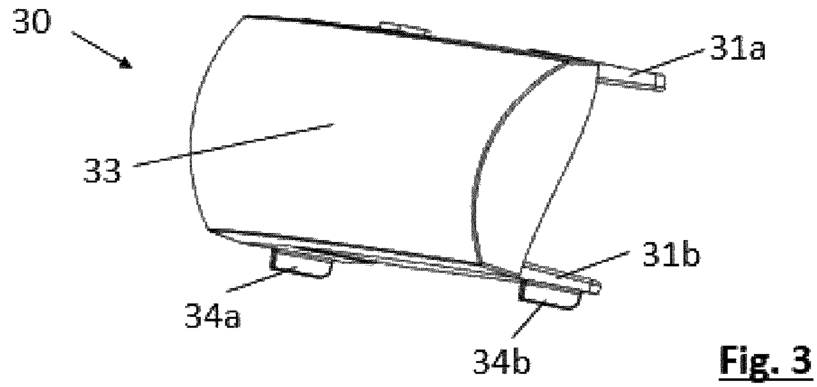
FIG. 3 shows the projection lens of the light module shown in FIG. 1.

The projection lens 30 is illustrated in particular in FIG. 3. The projection lens 30 has an optically active zone 33 for projecting the first light rays and the second light rays in order to form a first light beam and a second light beam, respectively.

The projection lens 30 extends in the transverse direction T, which is transverse to an optical axis of the light module. In the example illustrated, the support 40 extends in a plane parallel to the transverse direction T and to the optical axis of the light module.

The projection lens 30 comprises a mounting element 31*a* via which the projection lens 30 is fitted in the light module 1. The mounting element 31*a* is not optically active, meaning that it is not involved in the deflection of the first and second light rays. The mounting element 31*a* is situated at the periphery of the optically active zone 33. The mounting element 31*a* extends in particular transversely along the upper edge of the optically active zone 33, and in particular behind the optically active zone 33.

Figure 4:
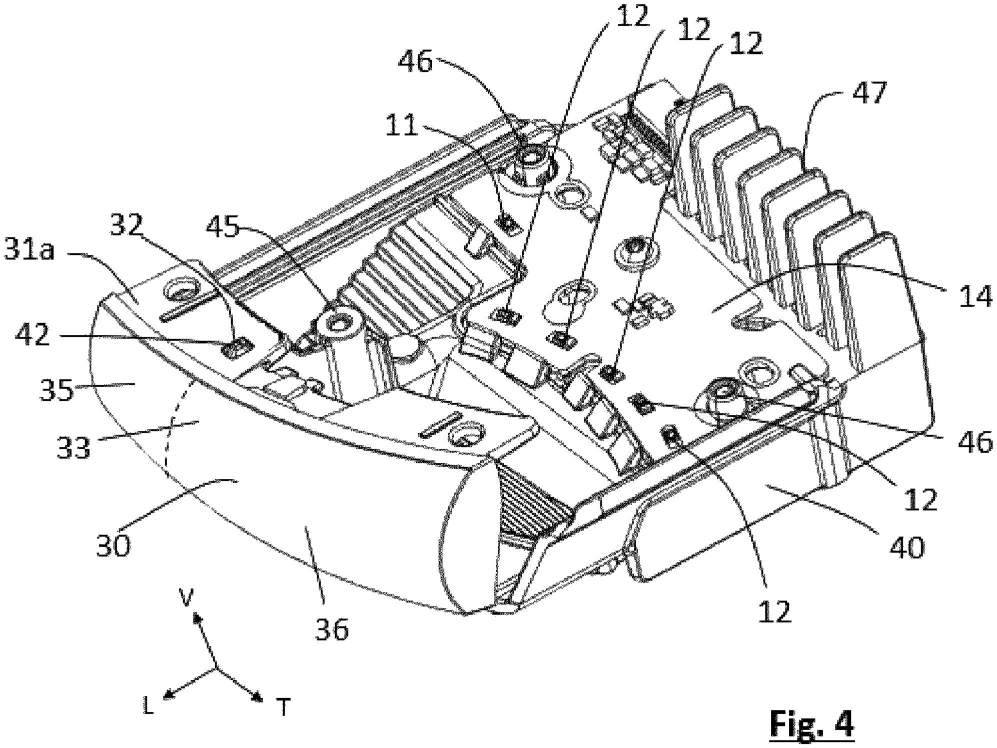
FIG. 4 shows the light module from FIG. 1, from which only the reflector has been removed.

The mounting element 31*a* has an orifice 32, which can be seen for example in FIG. 4. The mounting lug 42 of the wall 41 is positioned in the orifice 32 so as to position the projection lens 30 on and fix it to the wall 41. The cooperation between the mounting lug 42 and the orifice 32 makes it possible in particular to position the projection lens 30 in the transverse direction T and in the longitudinal direction L.

The projection lens 30 has an additional mounting element 31*b* situated at the periphery of the optically active zone 33. The additional mounting element 31*b* is not optically active, meaning that it is not involved in the deflection of the first and second light rays. The additional mounting element 31*b* is situated at the periphery of the optically active zone 33. The additional mounting element 31*b* extends in particular transversely along the lower edge of the optically active zone 33, and in particular behind the optically active zone 33.

The mounting element 31*a* and the additional mounting element 31*b* may be situated on a single part or may be situated on two separate parts, as in the example shown.

The additional mounting element 31*b* has a first lateral rib 34*a* and a second lateral rib 34*b* that are each situated at a lateral end of the additional mounting element 31*b*. The first lateral rib 41*a* is received in the first recess 44*a* of the support 40 and the second lateral rib 41*b* is received in the second recess 44*b* of the support 40. The cooperation of the first lateral rib 34*a* and the second lateral rib 34*b* with the first recess 44*a* and the second recess 44*b*, respectively, supplements the cooperation between the mounting lug 42 and the orifice 32 for the positioning of the projection lens 30 on the support 40. The cooperation of the first lateral rib 34*a* and the second lateral rib 34*b* with the first recess 44*a* and the second recess 44*b*, respectively, makes it possible in particular to position the projection lens 30 in the vertical direction V.

The reflector 20 makes it possible to reflect the first light rays and the second light rays. In particular, the reflector 20 reflects the first light rays and the second light rays towards the projection lens 30. The first and second light rays reflected by the reflector 20 are then projected by the projection lens 30 in order to form the first and second light beams.

The reflector 20 has a first reflective cavity 21 for reflecting the first light rays, and a second reflective cavity 22 for reflecting the second light rays. In particular, the second reflective cavity 22 has a plurality of sub-cavities 22*a*, 22*b*, 22*c*, 22*d*, 22*e*, each of which is arranged opposite one of the second light sources 12 and makes it possible to reflect the second light rays from the second light source 12 opposite which it is arranged.

The projection lens 30 also has a first portion 35 intended for the projection of the first light rays reflected by the first reflective cavity 21 and a second portion 36 intended for the projection of the second light rays reflected by the second reflective cavity 22.

Figure 5:
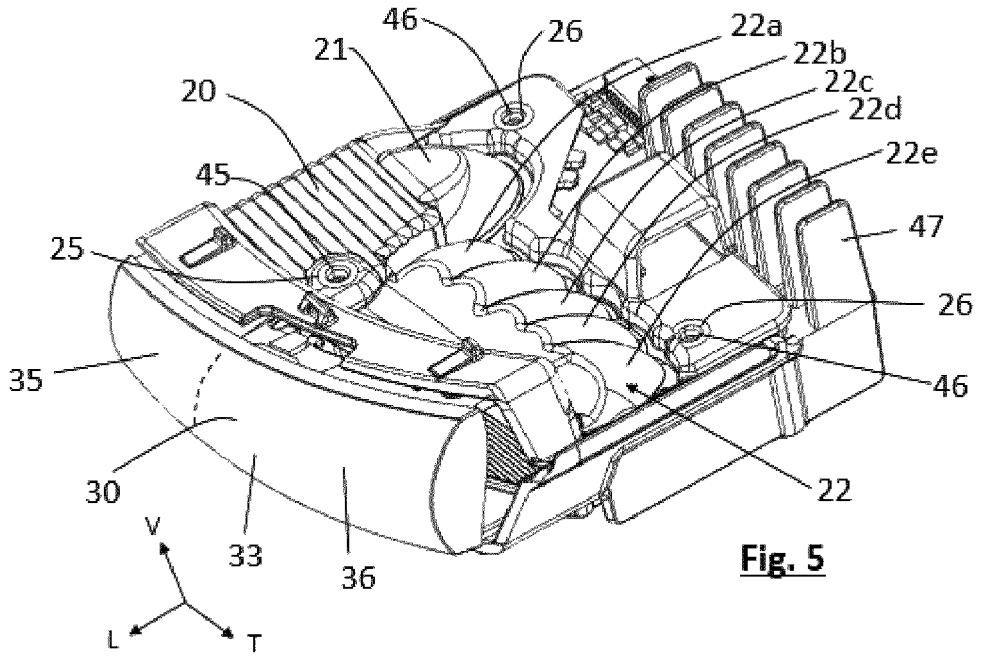
FIG. 5 shows the light module from FIG. 1 in a top view and in which the screws for attaching the reflector to the light module have been removed.

The reflector 20 has a second mechanical coupling element 25. This second mechanical coupling element 25 is coupled to the first mechanical coupling element 45 of the wall 41. In the example illustrated, and in particular as can be seen in FIG. 5, the second mechanical coupling element is a through-hole 25. The through-hole 25 is coupled to the screw bushing 45 of the wall 41. In particular, the screw bushing 45 and the through-hole 25 are aligned.

The light module 1 also has a holding element 5 cooperating with the first mechanical coupling element 45 and the second mechanical coupling element 25 in order to position the reflector 20 on and fix it to the wall 41.

Figure 6:
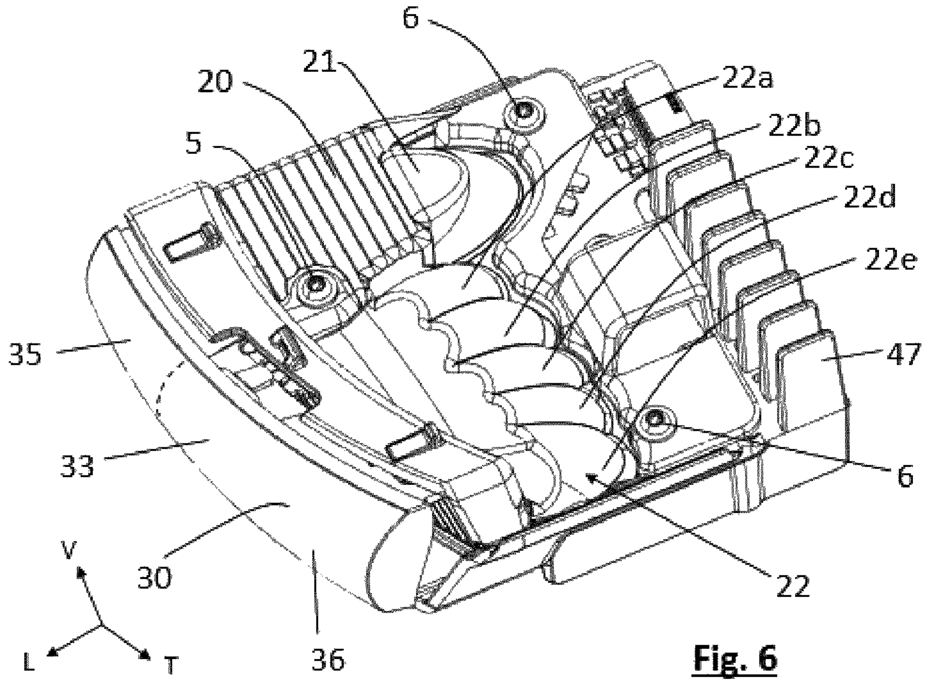
FIG. 6 shows the light module from FIG. 1 in a top view.

In the example illustrated, and in particular as can be seen in FIG. 6, the holding element is a main screw 5. The main screw 5 passes through the through-hole 25 and is screwed into the screw bushing 45. Thus, the reflector 20 is fixed to the wall 41, and is therefore positioned with respect to the support 40.

According to an example that is not shown, the first mechanical coupling element may be an indentation, the second mechanical coupling element may be a stem inserted into the indentation by way of a lower end, and the holding means may be a clip positioned at an upper end of the stem, at the opposite end from the lower end.

The main screw 5 is situated in front of the first reflective cavity 21 and the second reflective cavity 22. Thus, the positioning of the first reflective cavity 21 and the second reflective cavity 22 is precise and ensures that the first reflective cavity 21 and the second reflective cavity 22 are aligned with the first light source 11 and the second light sources 12, respectively.

The reflector 20 has additional through-holes 26. Each additional through-hole 26 is associated with an additional screw bushing 46 of the support 40. Moreover, the light module 1 has an additional screw 6 associated with each additional through-hole 26. Each additional screw 6 passes through the additional through-hole 26 with which it is associated and is fixed in the additional screw bushing 46 of the support 40 with which it is associated. Each additional screw 6 is situated behind the first reflective cavity 21 and the second reflective cavity 22. The additional screws 6 form supplementary fixing to the fixing realized by the main screw 5. They ensure a better hold of the reflector 20 on the support 40.

The invention claimed is:

1. A motor vehicle light module comprising:

at least one first light source intended to emit first light rays and at least one second light source intended to emit second light rays;

at least one optical device configured to deflect at least a part of the first light rays and second light rays, a support directly or indirectly supporting the first light source and the second light source, and at least one wall disposed on the support and configured to separate the first light rays from the second light rays, the optical device being positioned on and/or fixed to the wall, wherein said at least one optical device comprises a projection lens having an optically active zone configured to project the first light rays and the second light rays in order to form a first light beam and a second light beam, respectively, the wall has a mounting lug, the projection lens has at least one mounting element which is situated at the periphery of the optically active zone and via which the projection lens is fitted in the light module, the mounting element having an orifice, and the mounting lug of the wall being positioned in the orifice in the projection lens so as to position the projection lens on and/or fix it to the wall.

2. The motor vehicle light module according to claim 1, wherein the support has an upper face directly or indirectly supporting the first light source and the second light source, the upper face being intended to be a horizontal face when the light module is disposed in the motor vehicle.

3. The motor vehicle light module according to claim 2, wherein the support is a radiator configured to dissipate the heat energy emitted by the first light source and the second light source.

4. The motor vehicle light module according to claim 2, wherein the wall is integral with the support.

5. The motor vehicle light module according to claim 2, wherein the wall extends perpendicularly to the support.

6. The motor vehicle light module according to claim 2, wherein said at least one optical device comprises a projection lens having an optically active zone configured to project the first light rays and the second light rays in order to form a first light beam and a second light beam, respectively.

7. The motor vehicle light module according to claim 2, wherein said at least one optical device comprises a reflector that is able to reflect the first light rays and the second light rays, the reflector being positioned on and/or fixed to the wall.

8. The motor vehicle light module according to claim 1, wherein the support is a radiator configured to dissipate the heat energy emitted by the first light source and the second light source.

9. The motor vehicle light module according to claim 8, wherein the wall is integral with the support.

10. The motor vehicle light module according to claim 8, wherein the wall extends perpendicularly to the support.

11. The motor vehicle light module according to claim 1, wherein the wall is integral with the support.

12. The motor vehicle light module according to claim 1, wherein the wall extends perpendicularly to the support.

13. The motor vehicle light module according to claim 1, wherein said at least one optical device comprises a reflector that is able to reflect the first light rays and the second light rays, the reflector being positioned on and/or fixed to the wall.

14. The motor vehicle light module according to claim 13, wherein the reflector has at least one first reflective cavity that is able to reflect the first light rays emitted by the first light source and a second reflective cavity that is able to reflect the second light rays emitted by the second light source.

15. The motor vehicle light module according to claim 14, wherein said at least one optical device further comprises a projection lens, and the projection lens has at least one first portion intended for the projection of the first light rays reflected by the first reflective cavity, and a second portion intended for the projection of the second light rays reflected by the second reflective cavity.

16. The motor vehicle light module according to claim 13, further comprising a holding element, wherein the wall has a first mechanical coupling element, the reflector has a second mechanical coupling element coupled to the first mechanical coupling element, and the holding element cooperates with the first mechanical coupling element and the second mechanical coupling element in order to fix the reflector to the wall.

17. The motor vehicle light module according to claim 16, wherein the first mechanical coupling element is a screw bushing, the second mechanical coupling element is a through-hole and the holding element is a main screw that passes through the through-hole and is screwed into the screw bushing.

18. A motor vehicle light module comprising:

at least one first light source intended to emit first light rays and at least one second light source intended to emit second light rays;

at least one optical device configured to deflect at least a part of the first light rays and second light rays, a support directly or indirectly supporting the first light source and the second light source, at least one wall disposed on the support and configured to separate the first light rays from the second light rays, the optical device being positioned on and/or fixed to the wall, and a holding element, wherein said at least one optical device comprises a reflector that is able to reflect the first light rays and the second light rays, the reflector being positioned on and/or fixed to the wall, the wall has a first mechanical coupling element, the reflector has a second mechanical coupling element coupled to the first mechanical coupling element, and the holding element cooperates with the first mechanical coupling element and the second mechanical coupling element in order to fix the reflector to the wall.

19. A motor vehicle light module comprising:

at least one first light source intended to emit first light rays and at least one second light source intended to emit second light rays;

at least one optical device configured to deflect at least a part of the first light rays and second light rays, a support directly or indirectly supporting the first light source and the second light source, and at least one wall disposed on the support and configured to separate the first light rays from the second light rays, the optical device being positioned on and/or fixed to the wall, wherein the wall and the support are produced in a single injection-moulding operation and are integral with each other.

* * * * *